United States Patent
Palinsky et al.

(10) Patent No.: US 8,609,557 B2
(45) Date of Patent: Dec. 17, 2013

(54) TEXTILE SEMIFINISHED PRODUCT WITH AT LEAST ONE SURFACE PROVIDED WITH AN ADHESIVE

(75) Inventors: Andreas Palinsky, Moers (DE); Lars Ischtschuk, Hasbergen (DE); Ekkehard Roth, Winsen (DE)

(73) Assignee: Saertex GmbH & Co. KG, Saerbeck (DE)

( * ) Notice: Subject to any disclaimer, the term of this patent is extended or adjusted under 35 U.S.C. 154(b) by 392 days.

(21) Appl. No.: 12/735,294

(22) PCT Filed: Jan. 8, 2009

(86) PCT No.: PCT/EP2009/050173
§ 371 (c)(1),
(2), (4) Date: Jun. 30, 2010

(87) PCT Pub. No.: WO2009/087192
PCT Pub. Date: Jul. 16, 2009

(65) Prior Publication Data
US 2010/0273378 A1    Oct. 28, 2010

(30) Foreign Application Priority Data
Jan. 11, 2008   (DE) .......................... 10 2008 004 112

(51) Int. Cl.
B32B 27/04   (2006.01)
B32B 27/12   (2006.01)

(52) U.S. Cl.
USPC ............................. 442/149; 442/150; 442/156

(58) Field of Classification Search
USPC ......................................... 442/149, 156, 150
See application file for complete search history.

(56) References Cited

U.S. PATENT DOCUMENTS

| 4,874,655 | A |   | 10/1989 | Groshens |
|---|---|---|---|---|
| 5,401,565 | A |   | 3/1995 | Vouette |
| 5,766,534 | A |   | 6/1998 | White et al. |
| 6,166,143 | A | * | 12/2000 | Watanabe et al. ............. 525/208 |
| 2005/0095933 | A1 |   | 5/2005 | Kimbrell et al. |
| 2006/0048943 | A1 |   | 3/2006 | Parker et al. |
| 2007/0163707 | A1 |   | 7/2007 | Klethy et al. |

FOREIGN PATENT DOCUMENTS

| CN | 1122355 A | 5/1996 |
|---|---|---|
| DE | 37 83 755 T2 | 6/1993 |
| DE | 100 03 972 A1 | 7/2000 |
| DE | 695 18 503 T2 | 4/2001 |
| DE | 201 20 447 U1 | 5/2002 |
| DE | 101 32 342 A1 | 2/2003 |
| DE | 102 23 313 A1 | 12/2003 |
| DE | 20 2007 010 252 U1 | 11/2007 |
| EP | 0 362 059 A1 | 4/1990 |
| EP | 1 781 455 B1 | 10/2011 |
| JP | 63 309575 | 12/1988 |
| WO | 00 10964 A1 | 3/2000 |
| WO | WO 0010964 A1 | 3/2000 |
| WO | 00 34387 A1 | 6/2000 |
| WO | WO 0037561 A1 | 6/2000 |
| WO | WO 2006059056 A1 | 6/2006 |
| WO | 2007 038946 A1 | 4/2007 |

OTHER PUBLICATIONS

Ando, K., et al., Database WPI Week 200449, Thomson Scientific, London, GB; AN 2004-501508; XP002524279 & JP 2004-100059, 2004.

Shirahata, A., et al., Database WPI Week 198749 Thomson Scientific, London, GB; AN 1987-345586; XP002524280 & JP 62-250026, 1987.

Takada, T., et al., Database WPI Week 199604 Thomson Scientific, London, GB; AN 1996-035949; XP002524281 & JP 07-304879, 1995.

* cited by examiner

*Primary Examiner* — Lynda Salvatore
(74) *Attorney, Agent, or Firm* — Hudak, Shunk & Farine Co. LPA

(57) ABSTRACT

A textile semifinished product with at least one surface provided with an adhesive, wherein the adhesive is immobilized on the surface of the semifinished product in order to maintain the tack in a lasting manner. To this end, at least one constituent of the adhesive is partly crosslinked and the partly crosslinked constituent is the product of partial crosslinking of at least one monomer containing double bonds, the monomer containing double bonds being a partial ester prepared by the reaction of an epoxy resin with an unsaturated carboxylic acid.

20 Claims, No Drawings

TEXTILE SEMIFINISHED PRODUCT WITH AT LEAST ONE SURFACE PROVIDED WITH AN ADHESIVE

FIELD OF THE INVENTION

The present invention relates to a semifinished textile product with at least one surface provided with an adhesive wherein at least one constituent of the adhesive is partially crosslinked and the partially crosslinked constituent is the product of partial crosslinking of at least one monomer containing double bonds, wherein the monomer containing double bonds is a partial ester prepared by the reaction of an epoxy resin with an unsaturated carboxylic acid.

BACKGROUND OF THE INVENTION

It is known to give self-adhesive properties to textiles used as reinforcing materials for the production of fiber-reinforced components—so-called composites. In particular in the automotive industry, boat construction or in the field of rotors for wind turbine generators, where relatively large and complex preforms of dry reinforcing materials are to be produced, there is an interest in fixing the individual textile layers. For this purpose, usually a so-called textile binder is applied on the surface of the textiles, for example a hot melt adhesive on the basis of epoxy resins or polyamides or similar meltable strong resins. These self-adhesive textiles can then be placed in a mold and held on the mold or on a layer already fixed thereon, by the adhesive.

Also, in the construction of sandwich components, there is often the need to ensure the adhesion of textile layers on the core material used. This is usually balsa wood or foams of polyvinylchloride (PVC), polyethylene (PE), polypropylene (PP), polyurethane (PUR), polyethylene terephthalate (PET), polymethacrylimide (Rohacell®).

A drawback of the hot melt adhesives of the prior art is that they are not tacky in ambient temperature and therefore have to be heated for activation, or that with adhesives that are sufficiently tacky at room temperature, the tackiness of the textiles is reduced after just a short period of time, so that the textile cannot be stored over a longer period of time without losing tackiness. This is due both to the affinity of such melt adhesives towards the coating of the fibers used, in particular if they are formulated on the basis of epoxy resin, and also to the capillary effect of the filaments. These effects cause that the adhesive applied to the surface of the reinforcing material migrates into the interior of the textile after a short period of time. Other textile binders applied in powder form are not tacky at room temperature, but must be superficially melted in order to achieve fixing of the layers.

Furthermore, it is known to apply styrene-dissolvable rubber or rubber emulsions on the textiles to make their surfaces tacky.

Since rubber has a low solubility in the matrix resins used for composite production, rubber remains a foreign material within the fiber-reinforced component.

The consequences are bad surface quality of the fiber composite components, and a non-tolerable reduction of the mechanical strength values of the components by more than 25%.

SUMMARY OF THE INVENTION

The object of the present invention is therefore to provide a semifinished textile product with a tacky surface, which can be stored over longer periods of time and that has, if possible, no deleterious influence on the strength of the fiber composite components made thereof, in spite of its tackiness.

According to the present invention, the object is achieved by the characterizing features of providing at least one constituent of the adhesive partially crosslinked and the partially crosslinked constituent is the product of partial crosslinking of at least one monomer containing double bonds, wherein the monomer containing double bonds is a partial ester prepared by the reaction of an epoxy resin with an unsaturated carboxylic acid. Advantageous embodiments are defined in the dependent claims.

By partially crosslinking at least one constituent of the adhesive subsequent to the application of the adhesive on the semifinished textile product, the adhesive is immobilized. By immobilizing the adhesive on the surface of the semifinished textile product, further entering and/or soaking of the adhesive into the semifinished textile product can be avoided so that the adhesive remains almost completely on the surface even after long periods of storage time.

The partially crosslinked constituent of the adhesive is the product of a partial crosslinking of at least one monomer containing double bonds, wherein the partial crosslinking is initiated by a well dosed application of energy on the surface of the semifinished product, so that the partial crosslinking can take place after application of the adhesive on the semifinished product.

A partial ester produced by converting an epoxy resin with an unsaturated carboxylic acid is used as the monomer containing double bonds. This has the advantage of enabling an intermolecular link of the network resulting from the polymerization of the double bonds with the network resulting from a later crosslinking of existing epoxy groups (so-called interpenetrating networks).

To produce the partial esters, preferably bisphenol A, bisphenol F epoxy resins and/or particularly preferably epoxidized novolaks are used. The unsaturated carboxylic acid can be selected from C1 to C12 carboxylic acids, wherein the use of acrylic and methacrylic acids is particularly preferred, because they are available in sufficient quantities as cheap bulk chemicals and have a suitable reactivity with respect to the epoxy group.

The partial ester is advantageously made by means of an incomplete conversion of an epoxy resin with acrylic acid or methacrylic acid, wherein the incomplete reaction is controllable by the stoichiometry of the starting materials. This reaction is described in Publication of German Patent Application DE 10223313 A1, incorporated in its entirety herein by reference.

The adhesive preferably further comprises at least the following further constituents: an epoxy resin, a rubber component and an initiator.

A preferred composition of the adhesive contains, with reference to the weight of the entire mixture, about 25-40% rubber, 5-10% epoxy resin and 40-60% partial ester. Moreover, the adhesive formulation comprises a suitable initiator in the usual concentration from 0.2-3% (particularly preferably 1-2%). Furthermore, the adhesive can include the usual additives, such as pigments, processing aids or additives to improve wetting of surfaces.

Particularly preferably the initiator is a photoinitiator able to be activated by UV light, or a peroxide, because this enables the extent of the chemical partial crosslinking of the adhesive to be controllable.

An epoxy resin according to the prior art can be used for the semifinished textile product according to the present invention, wherein it is advantageous if the epoxy resin is a bisphenol A resin, a bisphenol F resin, tetraglycidyl methylene dianiline (TGMDA), triglycidyl paraaminophenol (TGPAP) and/or an epoxidized novolak. The advantages of these epoxy resins are that they are compatible with the other components of the adhesive, have excellent mechanical properties and ensure good tackiness.

Furthermore, at least one rubber component is necessary for the semifinished textile product according to the present invention, which can be a synthetic or natural rubber. Particularly suitable is amine and/or carboxy-terminated butadienenitrile rubber (Hycar CTBN or ATBN) with a mean molecular weight of 2000 to 6000 g/mole, preferably mixed with NBR having a molecular weight of 20000 g/mole to 2000000 g/mole, particularly preferably 50000 g/mole to 1000000 g/mole, because it has optimum tackiness and good compatibility with epoxy resins. The product properties can be additionally optimized by the prior conversion of the rubber component with epoxy resins, also referred to as adducting. Also suitable are carboxy-functionalized butadiene rubbers with a molecular weight of 2000 to 10000 g/mole, which can be produced, for example, by converting the homopolymerisates with maleic anhydride.

Particularly advantageously the adhesive used for the production of the semifinished product according to the present invention is capable of swelling and/or capable of partial solution in reaction resin mixtures containing epoxy resins, because this results in particularly close mixing of the adhesive with the resin matrix. This is essential for the resulting mechanical strength of the component made thereof.

As the textile base for the manufacture of the semifinished textile product according to the present invention, advantageously layers of fibers, woven, knitted and/or non-woven fabrics are used alone or in combination. These reinforcing materials can be prepared from glass, carbon, aramid, natural fibers, such as flax, hemp, sisal or basalt fibers. Other textile materials and constructions known from the prior can also be used.

The application of the adhesive on the textile base is preferably performed by means of spraying a solution or melt of the adhesive, wherein an amount of 2 to 50 g/m$^2$, particularly preferably 4 to 15 g/m$^2$, are applied to achieve optimum adhesive tackiness.

The semifinished textile products according to the present invention can be preferably used for the production of fiber-reinforced plastic materials, wherein the reaction resin used herein preferably comprises an epoxy resin, or is an epoxy resin. The particular advantage of the adhesive according to the present invention is the chemical reaction of the epoxy groups contained in the adhesive with the epoxy group of the reaction resin used and the resulting advantageous strength properties of the fiber composite component.

The semifinished textile products according to the present invention have stable surface tackiness over a period of more than 4 months up to several years at room temperature. Even at temperatures of about 60° C., good tackiness is maintained for a period of several weeks to months.

Moreover, the semifinished textile products according to the present invention have the advantage that textile reinforcement layers can be excellently positioned in a component mold and repositioned multiple times as needed, and thus enable the manufacture of complex three-dimensional preform geometries. The semifinished textile products according to the present invention are particularly suitable for the production of fiber-reinforced components in vacuum infusion and resin injection processes (such as in resin infusion, resin transfer molding etc).

Furthermore, the semifinished textile products according to the present invention have the advantage that the adhesive used does not significantly affect the mechanical strength values of the fiber-reinforced component.

The properties achieved enable the semifinished textile products according to the present invention to be used for the manufacture of lightweight structures in the field of automotive engineering, aerospace, boat and ship building, sports articles and rotor blades for wind turbine generators.

The invention will be explained in more detail in the following with reference to two exemplary examples and three comparative examples:

EXAMPLE 1

Composition of the Adhesive 270 g of a conversion product of Hycar CTBN 1300×13 (Noveon) with EPR 0164 (Bakelite AG)
80 g EPR 0164 (Bakelite AG)
200 g EPR 05322 (Bakelite AG)
439 g EPA 03582 (Bakelite AG)
15 g Genocoure MBF (Rahn AG)
15 Cab-O-Sil TS 720

To produce the semifinished textile product according to the present invention, the adhesive is preheated to a suitable temperature and sprayed onto the textile. It is also possible to dissolve the adhesive in acetone or methyl ethyl ketone and to apply it to the respective textile without previous heating. By coating a unidirectional layer of glass fibers (electrical grade glass; 2400 tex) with a weft percentage of 3% in the 90° direction (electrical grade glass; 68 tex) with 10+/−2 g/m$^2$ of the above-mentioned adhesive and partial crosslinking by means of UV irradiation, the textile is given sufficient and durable tackiness for more than four weeks without having to suffer any noticeable reduction in the mechanical properties. Moreover, temperature resistance at 60° C. is achieved.

Comparison of mechanical characteristics with and without the provision of adhesive:

GFK sample body: 8 layers of UD with about 1190 g/m$^2$ weight per unit area
Sample thickness 6.1 mm; FHG 61 vol %
Resin system Hexion RIM135/RIMH137
Samples with adhesive according to example 1 unilaterally coated with about 10 g/m$^2$ Three-point bending test according to DIN EN ISO 14125

| Test registration direction: | 0° |
| --- | --- |
| Die radius R1: | 5 mm |
| Support radius R2: | 5 mm |
| Test speed: | 2 mm per minute |

| Test results: Sample body | Modulus of Elasticity [GPa] | Rm [MPa] |
| --- | --- | --- |
| without adhesive | 48 | 940 |
| with adhesive | 46 | 920 |

EXAMPLE 2

Composition of the Adhesive 100 g Hycar CTBN 1300×13 (Noveon)
20 g Araldite GY 250 (Huntsman)
40 g EPR 03161 (Bakelite AG)
220 g EPA 04704 (Bakelite AG)
2 weight % MEKP
0.15 weight % Co-catalyst To produce the semifinished textile product according to the present invention, the adhesive is preheated to a suitable temperature and sprayed onto the textile. It is also possible to dissolve the adhesive in acetone or methyl ethyl ketone and to apply it to the respective textile without previous heating. By coating a unidirectional layer of glass fibers (electric grade glass; 2400 tex) with a weft percentage of 3% in the 90° direction (electric grade glass; 68 tex) with 10+/−2 g/m² of the above-mentioned adhesive and partial crosslinking by means of thermal activation for about 30 minutes at about 90° C., the textile is given sufficient and durable tackiness for more than four weeks without having to suffer any noticeable reduction in the mechanical properties. Moreover, temperature resistance at 60° C. is achieved.

COMPARATIVE EXAMPLE A

Composition of the Adhesive 2 weight % EPR 5311 (Bakelite AG)
86 weight % EPR 5322 (Bakelite AG)
12 weight % Hycar CTBN 1300×13 (Noveon)

To produce the semifinished textile product, the adhesive is preheated to a suitable temperature and sprayed onto the textile. It is also possible to dissolve the adhesive in acetone or methyl ethyl ketone and to apply it to the respective textile without previous heating. A unidirectional layer of glass fibers (electric grade glass; 2400 tex) with a weft percentage of 3% in the 90° direction (electric grade glass; 68 tex) is coated with 10+/−2 g/m² of the above-mentioned adhesive. The resulting semifinished textile product shows high initial tackiness. However, the adhesive sinks into the layer of fibers within less than five days. Moreover, temperature resistance at 60° C. is not achieved.

COMPARATIVE EXAMPLE B

Composition of the Adhesive 2 weight % BYK 410 (BYK)
65 weight % EPR 5322 (Bakelite AG)
33 weight % Hycar CTBN 1300×13 (Noveon)

To produce the semifinished textile product according to the present invention, the adhesive is preheated to a suitable temperature and sprayed on to the textile. It is also possible to dissolve the adhesive in acetone or methyl ethyl ketone and to apply it to the textile in question without previous heating. A unidirectional layer of glass fibers (electric grade glass; 2400 tex) with a weft percentage of 3% in the 90° direction (electric grade glass; 68 tex) is coated with 10+/−2 g/m² of the above-mentioned adhesive. The resulting semifinished textile product shows high initial tackiness. However, the adhesive sinks into the layer of fibers within less than five days. Sinking-in is already observed after one day. Moreover, a temperature resistance at 60° C. is not achieved.

COMPARATIVE EXAMPLE C

Composition of the Adhesive 0.5 weight % EPR 5311 (Bakelite AG)
79.25 weight % EPR 5322 (Bakelite AG)
16.25 weight % Hycar CTBN 1300×13 (Noveon)
2 weight % BYK 410 (BYK)
2 weight % Aerosil A380 (Degussa)

To produce the semifinished textile product according to the present invention, the adhesive is preheated to a suitable temperature and sprayed onto the textile. It is also possible to dissolve the adhesive in acetone or methyl ethyl ketone and to apply it to the textile in question without previous heating. A unidirectional layer of glass fibers (electric grade glass; 2400 tex) with a weft percentage of 3% in the 90° direction (electric grade glass; 68 tex) is coated with 10+/−2 g/m² of the above-mentioned adhesive. The resulting semifinished textile product shows high initial tackiness. However, the adhesive sinks into the layer of fibers within less than fourteen days. Moreover, temperature resistance at 60° C. is not achieved.

What is claimed is:

1. A semifinished textile product comprising: at least one surface provided with an adhesive, wherein at least one constituent of the adhesive is partially crosslinked and the partially crosslinked constituent is the product of partial crosslinking of at least one monomer containing double bonds, wherein the monomer containing double bonds is a partial ester prepared by the reaction of an epoxy resin with an unsaturated carboxylic acid.

2. The semifinished textile product according to claim 1, wherein the partial ester is the product of conversion of an epoxy resin with acrylic acid or methacrylic acid in a substoichiometric amount.

3. The semifinished textile product according to claim 1, wherein the partial ester is an epoxidized novolak.

4. The semifinished textile product according to claim 1, wherein the adhesive further contains at least the following further constituents: at least one epoxy resin, at least one rubber component and at least one initiator.

5. The semifinished textile product according to claim 4, wherein the initiator is a photoinitiator or a peroxide.

6. The semifinished textile product according to claim 1, wherein the partial crosslinking of the partially crosslinked constituents of the adhesive occurs on the surface of the semifinished textile product by irradiating the semifinished textile product with UV radiation.

7. The semifinished textile product according to claim 1, wherein the epoxy resin is a bisphenol A resin, a bisphenol F resin, tetraglycidyl methylene dianiline (TGMDA), triglycidyl paraaminophenol (TGPAP) and/or an epoxidized novolak.

8. The semifinished textile product according to claim 4, wherein the rubber component is a synthetic or a natural rubber.

9. The semifinished textile product according to claim 1, wherein the adhesive is capable of being swelled and/or partially dissolved in reaction resin mixtures containing epoxy resins.

10. The semifinished textile product according to claim 1, wherein the semifinished product is a layer or layers of fibers, a woven, knitted or non-woven fabric.

11. The semifinished textile product according to claim 1, wherein the textile consists of glass, carbon, basalt, natural fibers, such as flax, hemp, sisal and/or aramid fibers.

12. A fiber-reinforced plastic material comprising the semifinished textile product according to claim 1.

13. The fiber-reinforced plastic according to claim 12 that includes at least an epoxy resin.

14. The semifinished textile product according to claim 2, wherein the partial ester is an epoxidized novolak.

15. The semifinished textile product according to claim 14, wherein the adhesive further contains at least the following further constituents: at least one epoxy resin, at least one rubber component and at least one initiator.

16. The semifinished textile product according to claim 15, wherein the initiator is a photoinitiator or a peroxide; and wherein the partial crosslinking of the partially crosslinked constituents of the adhesive occurs on the surface of the semifinished textile product by irradiating the semifinished textile product with UV radiation.

17. The semifinished textile product according to claim 16, wherein the epoxy resin is a bisphenol A resin, a bisphenol F resin, tetraglycidyl methylene dianiline (TGMDA), triglycidyl paraaminophenol (TGPAP) and/or an epoxidized novolak; and wherein the rubber component is a synthetic or a natural rubber.

18. The semifinished textile product according to claim 17, wherein the adhesive is capable of being swelled and/or partially dissolved in reaction resin mixtures containing epoxy resins.

19. The semifinished textile product according to claim 18, wherein the semifinished product is a layer or layers of fibers, a woven, knitted or non-woven fabric; and wherein the textile consists of glass, carbon, basalt, natural fibers, such as flax, hemp, sisal and/or aramid fibers.

20. The semifinished textile product according to claim 4, wherein the epoxy resin is a bisphenol A resin, a bisphenol F resin, tetraglycidyl methylene dianiline (TGMDA), triglycidyl paraaminophenol (TGPAP) and/or an epoxidized novolak.

\* \* \* \* \*